(12) United States Patent
Pham et al.

(10) Patent No.: US 7,794,618 B2
(45) Date of Patent: Sep. 14, 2010

(54) AZEOTROPE-LIKE COMPOSITIONS OF PENTAFLUOROPROPENE AND 1,1,1,2,2-PENTAFLUOROPROPANE

(75) Inventors: Hang T. Pham, Amherst, NY (US); Ryan J. Hulse, Getzville, NY (US); Rajiv R. Singh, Getzville, NY (US)

(73) Assignee: Honeywell International Inc., Morristown, NJ (US)

( * ) Notice: Subject to any disclaimer, the term of this patent is extended or adjusted under 35 U.S.C. 154(b) by 458 days.

(21) Appl. No.: 11/955,587

(22) Filed: Dec. 13, 2007

(65) Prior Publication Data
US 2009/0151365 A1 Jun. 18, 2009

(51) Int. Cl.
*C09K 5/04* (2006.01)

(52) U.S. Cl. .............................. 252/68; 252/67; 264/53; 222/635

(58) Field of Classification Search ................... 252/67, 252/68; 264/53; 222/635
See application file for complete search history.

(56) References Cited

U.S. PATENT DOCUMENTS

| | | | |
|---|---|---|---|
| 7,077,960 B2 | 7/2006 | Balthasart et al. | 210/635 |
| 7,161,049 B2 | 1/2007 | Rao et al. | 570/243 |
| 2006/0106263 A1 | 5/2006 | Miller | |
| 2006/0243944 A1 | 11/2006 | Minor et al. | |
| 2007/0108403 A1 | 5/2007 | Sievert et al. | |

*Primary Examiner*—John R Hardee
(74) *Attorney, Agent, or Firm*—Bruce Bradford

(57) ABSTRACT

The present invention provides azeotrope-like compositions of 1,1,1,2,2-pentafluoropropane (HFC-245cb) with either the Z isomer of 1,1,1,2,3-pentafluoropropene (HFO-1225yeZ) alone or with mixtures of the E and Z isomers of 1,1,1,2,3-pentafluoropropene (HFO-1225 yeZ and HFO-1225 yeE) and uses thereof, including use in refrigerant compositions, refrigeration systems, blowing agent compositions, and aerosol propellants, and in process for separating azeotrope-like mixtures.

30 Claims, 1 Drawing Sheet

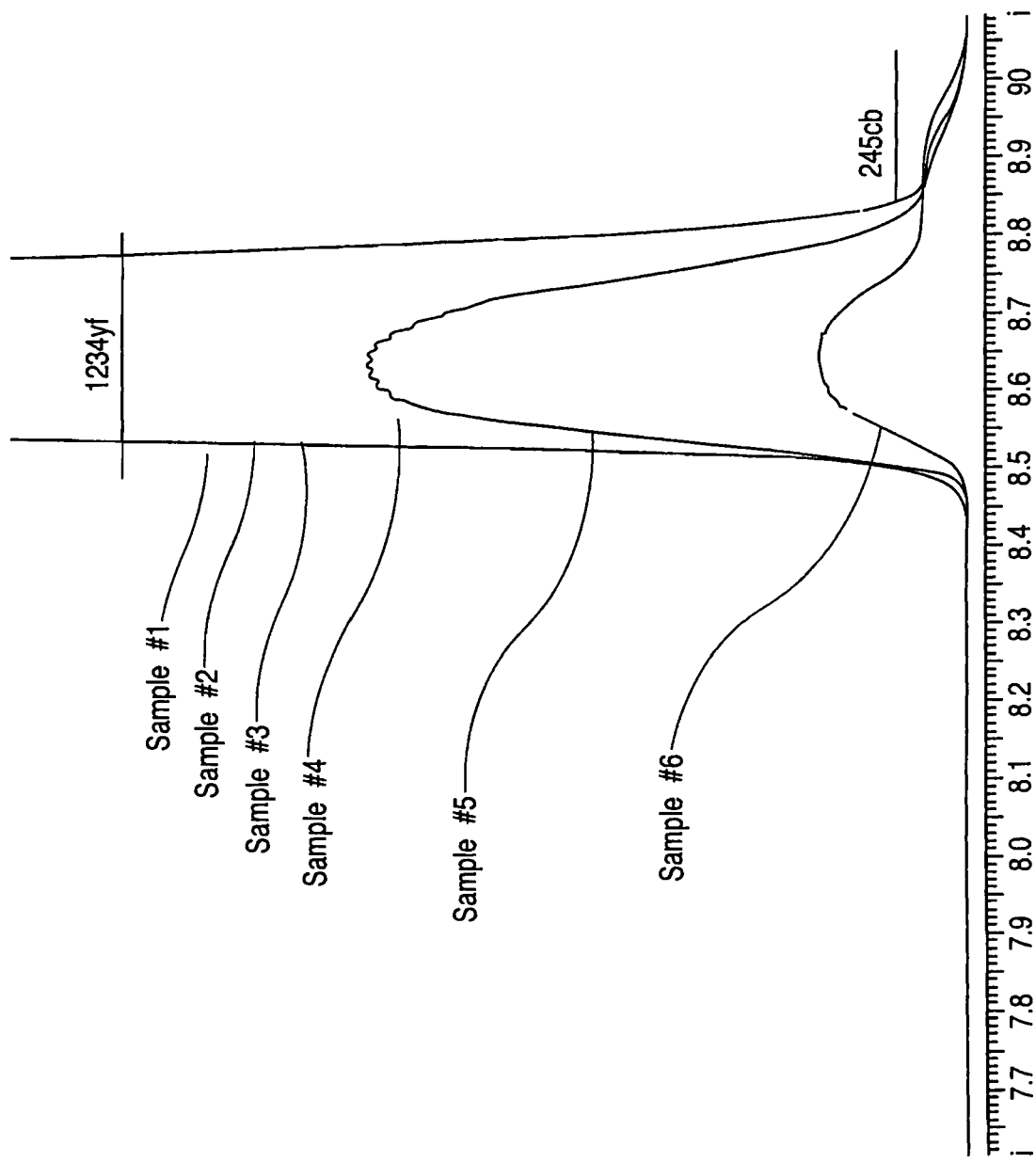

AZEOTROPE-LIKE COMPOSITIONS OF PENTAFLUOROPROPENE AND 1,1,1,2,2-PENTAFLUOROPROPANE

BACKGROUND OF THE INVENTION

1. Field of the Invention

The present invention provides azeotrope-like compositions of 1,1,1,2,2-pentafluoropropane (HFC-245cb) with either the Z isomer of 1,1,1,2,3-pentafluoropropene (HFO-1225ye(Z)) or with a mixture of the E and Z isomers of 1,1,1,2,3-pentafluoropropene (HFO-1225 ye(Z) and HFO-1225 ye(E)); and uses thereof, and in process for separating the azeotrope-like mixtures.

2. Description of the Related Art

Fluorocarbon based fluids have found widespread use in industry in a number of applications, including as refrigerants, aerosol propellants, blowing agents, heat transfer media, and gaseous dielectrics. Because of the suspected environmental problems associated with the use of some of these fluids, including the relatively high global warming potentials associated therewith, it is desirable to use fluids having low or even zero ozone depletion potential. Thus, the use of fluids that do not contain chlorofluorocarbons ("CFCs") or hydrochlorofluorocarbons ("HCFCs") is desirable. Compounds having a low ozone depletion potential include hydrofluorocarbons ("HFCs"), especially hydrofluoroolefins ("HFO's"). Compounds having a low global warming potential are also desirable. In this regard, the use of alkenes is also desirable due to their short atmospheric lifetime which results in a relatively low global warming potential. Additionally, the use of single component fluids or azeotropic mixtures, which do not fractionate on boiling and evaporation, is desirable. However, the identification of new, environmentally safe, non-fractionating mixtures is complicated due to the fact that azeotrope formation is not readily predictable.

The industry is continually seeking new fluorocarbon based mixtures that offer alternatives, and are considered environmentally safer substitutes for CFCs and HCFCs. Of particular interest are mixtures containing hydrofluorocarbons, fluoroolefins and other fluorinated compounds, which have a low ozone depletion potentials and low global warming potential. Such mixtures are the subject of this invention.

U.S. Pat. No. 7,161,049 shows a process for purifying hydrofluoropropanes which may include HFC-235cb or HFO-1225ye, however, no azeotrope-like compositions thereof are disclosed. U.S. Pat. No. 7,077,960 discloses a process for the production of a hydrofluoroalkane, according to which hydrofluoroalkane comprising organic impurities is subjected to at least two distillations. Again, no azeotrope-like compositions thereof are disclosed. This invention concerns compositions that help to satisfy the continuing need for alternatives to CFCs and HCFCs. The compositions of the invention exhibit relatively low global warming potentials ("GWP"). Accordingly, it has been recognized that such compositions can be used to great advantage in a number of applications, including as replacements for CFCs, HCFC's, and HFCs such as HFC-134a in refrigerant, aerosol, blowing agents, and other applications. This is accomplished by azeotrope-like compositions of HFC-245cb with either the Z isomer of HFO-1225ye(Z) or with mixtures of the E and Z isomers HFO-1225 ye(Z) and HFO-1225 ye(E).

BRIEF DESCRIPTION OF THE DRAWING

FIG. 1 shows a graph of HFO-1234yf and HFC-245cb peaks that were analyzed by gas chromatography during distillation in Example 3.

DETAILED DESCRIPTION OF THE INVENTION

The present invention provides an azeotrope-like composition comprising a first component comprising 1,1,1,2,2-pentafluoropropane and a second component which comprises either the Z isomer of 1,1,1,2,3-pentafluoropropene or a mixture of the E of 1,1,1,2,3-pentafluoropropene and the Z isomer of 1,1,1,2,3-pentafluoropropene. That is, in one embodiment, the second component comprises the Z isomer of 1,1,1,2,3-pentafluoropropene. In another embodiment, the second component comprises a mixture of the E of 1,1,1,2,3-pentafluoropropene and the Z isomer of 1,1,1,2,3-pentafluoropropene. The azeotrope-like compositions of the present invention exhibits properties that make that make them advantageous for use as, or in, a refrigerant, an aerosol, and blowing agent compositions.

Azeotrope-Like Compositions

As used herein, the term "azeotrope-like" is intended in its broad sense to include both compositions that are strictly azeotropic and compositions that behave like azeotropic mixtures. From fundamental principles, the thermodynamic state of a fluid is defined by pressure, temperature, liquid composition, and vapor composition. An azeotropic mixture is a system of two or more components in which the liquid composition and vapor composition are equal at the stated pressure and temperature. In practice, this means that the components of an azeotropic mixture are constant-boiling and cannot be separated during a phase change.

The azeotrope-like compositions of the invention may include additional components that do not form new azeotrope-like systems, or additional components that are not in the first distillation cut. The first distillation cut is the first cut taken after the distillation column displays steady state operation under total reflux conditions. One way to determine whether the addition of a component forms a new azeotrope-like system so as to be outside of this invention is to distill a sample of the composition with the component under conditions that would be expected to separate a non-azeotropic mixture into its separate components. If the mixture containing the additional component is non-azeotrope-like, the additional component will fractionate from the azeotrope-like components. If the mixture is azeotrope-like, some finite amount of a first distillation cut will be obtained that contains all of the mixture components that is constant boiling or behaves as a single substance.

It follows from this that another characteristic of azeotrope-like compositions is that there is a range of compositions containing the same components in varying proportions that are azeotrope-like or constant boiling. All such compositions are intended to be covered by the terms "azeotrope-like" and "constant boiling". As an example, it is well known that at differing pressures, the composition of a given azeotrope will vary at least slightly, as does the boiling point of the composition. Thus, an azeotrope of A and B represents a unique type of relationship, but with a variable composition depending on temperature and/or pressure. It follows that, for azeotrope-like compositions, there is a range of compositions containing the same components in varying proportions that are azeotrope-like. All such compositions are intended to be covered by the term azeotrope-like as used herein. It is well-recognized in the art that it is not possible to predict the formation of azeotropes. (See, for example, U.S. Pat. No. 5,648,017 (column 3, lines 64-65) and U.S. Pat. No. 5,182,040 (column 3, lines 62-63), both of which are incorporated herein by reference). Applicants have discovered unexpectedly that HFC-245cb and HFO-1225ye(Z) or HFC-245cb and a mixture of HFO-E/Z 1225ye form azeotrope-like compositions.

According to certain preferred embodiments, the azeotrope-like compositions of the present invention comprise, and preferably consist essentially of, effective amounts of a first component of 1,1,1,2,2-pentafluoropropane and a second component which is either the Z isomer of 1,1,1,2,3-pentafluoropropene or a mixture of the E of 1,1,1,2,3-pentafluoropropene and the Z isomer of 1,1,1,2,3-pentafluoropropene. The term "effective amounts" as used herein refers to the amount of each component which upon combination with the other component, results in the formation of an azeotrope-like composition of the present invention.

Any of a wide variety of methods known in the art for combining two or more components to form a composition can be adapted for use in the present methods to produce an azeotrope-like composition. For example, the first component and the second component can be mixed, blended, or otherwise contacted by hand and/or by machine, as part of a batch or continuous reaction and/or process, or via combinations of two or more such steps. In light of the disclosure herein, those of skill in the art will be readily able to prepare azeotrope-like compositions according to the present invention without undue experimentation.

In one embodiment the azeotrope-like composition comprises the 1,1,1,2,2-pentafluoropropane first component in an amount of from about 1 wt. % to about 50 wt. %, preferably from about 4 wt. % to about 46 wt. %, and more preferably from about 11 wt. % to about 41 wt. % based on the weight of the azeotrope-like composition; and the second component comprises the Z isomer of 1,1,1,2,3-pentafluoropropene which is present in an amount of from about 50 wt. % to about 99 wt. %, preferably from about 54 wt. % to about 96 wt. %, and more preferably from about 59 wt. % to about 89 wt. % based on the weight of the azeotrope-like composition. In this embodiment the azeotrope-like composition has a boiling point of from about −18.9° C. to about −19.3° C., preferably from about −18.9° C. to about −19° C. at a pressure of about 14.4 psia.

In another embodiment, azeotrope-like composition comprises a second component which comprises a mixture of the E and Z isomers of 1,1,1,2,3-pentafluoropropene (HFO-1225 ye(Z) and HFO-1225 ye(E)). In this embodiment, the Z isomer is present in the second component portion of the azeotrope-like composition at a weight ratio of from about 5 wt. % to about 95 wt. %, preferably from about 15 wt. % to about 90 wt. %, and more preferably from about 45 wt. % to about 85 wt. % based on the total weight of the second component. In this embodiment, the E isomer is present in the second component portion of the azeotrope-like composition at a weight ratio of from about 95 wt. % to about 5 wt. %, preferably from about 85 wt. % to about 10 wt. %, and more preferably from about 55 wt % to about 15 wt % based on the total weight of the second component.

In this embodiment which comprises a mixture of the E and Z isomers of 1,1,1,2,3-pentafluoropropene, the 1,1,1,2,2-pentafluoropropane first component is present in the overall azeotrope-like composition in an amount of from about 70 wt. % to less than 100 wt. %, preferably from about 75 wt. % to about 95 wt. % and more preferably from about 80 wt. % to about 90 wt. % based on the weight of the azeotrope-like composition. In this embodiment, in which the second component comprises a mixture of the E and Z isomers of 1,1,1,2,3-pentafluoropropene (HFO-1225 yeZ and HFO-1225 yeE), the second component is present in the overall azeotrope-like composition in an amount of from greater than zero to about 30 wt. %, preferably from about 5 wt. %, to about 25 wt. % and more preferably from about 10 wt. % to about 20 wt. % based on the weight of the azeotrope-like composition. In this embodiment the azeotrope-like composition has a boiling point of from about −17.7° C. to about −18° C., preferably from about −18.9° C. to about −17.8° at a pressure of about 14.4 psia.

The invention further provides a process for separating a first component comprising 1,1,1,2,2-pentafluoropropane from an azeotrope-like composition of 1,1,1,2,2-pentafluoropropane and a second component which comprises either the Z-isomer of 1,1,1,2,3-pentafluoropropene or a mixture of the E isomer of 1,1,1,2,3-pentafluoropropene and the Z isomer of 1,1,1,2,3-pentafluoropropene comprising the steps of (A) distilling a composition comprising an azeotrope-like composition of a first component comprising 1,1,1,2,2-pentafluoropropane and a second component which comprises either the Z-isomer of 1,1,1,2,3-pentafluoropropene or a mixture of the E isomer of 1,1,1,2,3-pentafluoropropene and the Z isomer of 1,1,1,2,3-pentafluoropropene at a first pressure to produce a first overhead stream enriched in either the first component comprising 1,1,1,2,2-pentafluoropropane or the second component which comprises Z-isomer of 1,1,1,2,3-pentafluoropropene or a mixture of the E isomer of 1,1,1,2,3-pentafluoropropene and the Z isomer of 1,1,1,2,3-pentafluoropropene and a first bottoms stream enriched in the other component; and (B) redistilling the first overhead stream at a second pressure to produce a second overhead stream enriched in the component enriched in the first bottoms stream and a second bottoms stream enriched in the component enriched in the first overhead stream.

The invention still further provides a method for modifying a refrigeration apparatus which refrigeration apparatus comprises a refrigerant, which refrigerant comprises a combination of a chlorofluorocarbon or a hydrochlorofluorocarbon and a mineral oil, comprising removing at least a portion of the chlorofluorocarbon or hydrochlorofluorocarbon from the refrigerant and leaving a residue comprising the mineral oil, and adding to said residue an azeotrope-like composition comprising a first component comprising 1,1,1,2,2-pentafluoropropane and a second component which comprises either the Z isomer of 1,1,1,2,3-pentafluoropropene or a mixture of the E isomer of 1,1,1,2,3-pentafluoropropene and the Z isomer of 1,1,1,2,3-pentafluoropropene.

The present compositions have utility in a wide range of applications. For example, one embodiment of the present invention relates to blowing agent, aerosol and cleaning, and refrigerant compositions comprising the present azeotrope-like compositions.

Yet another embodiment of the present invention relates to a blowing agent comprising one or more azeotrope-like compositions of the invention. One embodiment of the present invention relates to methods of forming thermoset foams, and preferably polyurethane and polyisocyanurate foams. The methods generally comprise providing a blowing agent composition of the present inventions, directly or indirectly adding the blowing agent composition to a foamable composition, and reacting the foamable composition under the conditions effective to form a foam or cellular structure, as is well known in the art. These comprise a foamable composition comprising the azeotrope-like composition above and at least one thermoset foam component. For example, the thermoset foam component may comprise a composition capable of forming a polyurethane foam, a polyisocyanurate foam or a phenolic foam. It is possible to produce thermoplastic foams using the compositions of the invention. These foams may be open cell or closed cell. Any of the methods well known in the art, such as those described in "Polyurethanes Chemistry and Technology," Volumes I and II, Saunders and Frisch, 1962, John Wiley and Sons, New York, N.Y., which is incorporated herein by reference, may be used or adapted for use in accordance with the foam embodiments of the present invention.

In general, polyurethane or polyisocyanurate foams are prepared by combining an isocyanate, the polyol premix composition, and other materials such as optional flame retardants, colorants, or other additives. These foams can be rigid, flexible, or semi-rigid, and can have a closed cell structure, an open cell structure or a mixture of open and closed cells. In general, such preferred methods comprise preparing polyurethane or polyisocyanurate foams by combining an isocyanate, a polyol or mixture of polyols, a blowing agent or mixture of blowing agents comprising one or more of the present compositions, and other materials such as catalysts, surfactants, and optionally, flame retardants, colorants, or other additives.

It is convenient in many applications to provide the components for polyurethane or polyisocyanurate foams in pre-blended formulations. Most typically, the foam formulation is pre-blended into two components. The isocyanate and optionally certain surfactants and blowing agents comprise the first component, commonly referred to as the "A" component. The polyol or polyol mixture, a surfactant including silicone surfactants, catalysts including amine catalysts, blowing agents, flame retardant, and other isocyanate reactive components comprise the second component, commonly referred to as the "B" component. The blowing agent comprises the azeotrope-like composition of this invention and optionally a hydrocarbon, halogenated hydrocarbon, $CO_2$ generating material, or combinations thereof. Preferably the halogenated hydrocarbon comprises a chlorofluorocarbon, hydrochlorofluorocarbon, hydrofluorocarbon, or combinations thereof. The blowing agent component is usually present in the polyol premix composition in an amount of from about 1 wt. % to about 30 wt. %, by weight of the polyol premix composition. The polyol component, can be any polyol which reacts in a known fashion with an isocyanate in preparing a polyurethane or polyisocyanurate foam. Useful polyols comprise one or more of a sucrose containing polyol; phenol, a phenol formaldehyde containing polyol; a glucose containing polyol; a sorbitol containing polyol; a methylglucoside containing polyol; an aromatic polyester polyol; glycerol; ethylene glycol; diethylene glycol; propylene glycol; graft copolymers of polyether polyols with a vinyl polymer; a copolymer of a polyether polyol with a polyurea, or combinations thereof. The polyol component is usually present in the polyol premix composition in an amount of from about 60 wt. % to about 95 wt. %, by weight of the polyol premix composition. The polyol premix composition next contains a surfactant component which silicone surfactant and optionally an additional non-silicone surfactant. The surfactant is usually present in the polyol premix composition in an mount of from about 0.5 wt. % to about 5.0 wt. % by weight of the polyol premix composition. The polyol premix composition next contains a catalyst which is preferably an amine. Tertiary amines are preferred. Preferred amines include: N,N-dimethylcyclohexylamine, dimethlyethanolamine, N,N, N', N', N'', N''-pentamethyldiethylenetriamine, 1,4-diaza-bicyclo [2.2.2]octane (DABCO), and triethylamine. The catalyst is usually present in the polyol premix composition in an amount of from about 0.1 wt. % to about 3.5 wt. % by weight of the polyol premix composition.

A foamable composition suitable for forming a polyurethane or polyisocyanurate foam may be formed by reacting an organic polyisocyanate and the polyol premix composition described above. Any organic polyisocyanate can be employed in polyurethane or polyisocyanurate foam synthesis inclusive of aliphatic and aromatic polyisocyanates. Suitable organic polyisocyanates include aliphatic, cycloaliphatic, araliphatic, aromatic, and heterocyclic isocyanates which are well known in the field of polyurethane chemistry. These are described in, for example, U.S. Pat. Nos. 4,868,224; 3,401,190; 3,454,606; 3,277,138; 3,492,330; 3,001,973; 3,394,164; 3,124,605; and 3,201,372. Preferred as a class are the aromatic polyisocyanates. Representative organic polyisocyanates correspond to the formula:

$$R(NCO)_z$$

wherein R is a polyvalent organic radical which is either aliphatic, aralkyl, aromatic or mixtures thereof, and z is an integer which corresponds to the valence of R and is at least two.

Accordingly, polyurethane or polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, and even other polyols can be added as a third stream to the mix head or reaction site. Most preferably, however, they are all incorporated into one B-component as described above. Conventional flame retardants can also be incorporated, preferably in amount of not more than about 20 percent by weight of the reactants.

In addition to the previously described ingredients, other ingredients such as, dyes, fillers, pigments and the like can be included in the preparation of the foams. Dispersing agents and cell stabilizers can be incorporated into the present blends. Conventional fillers for use herein include, for example, aluminum silicate, calcium silicate, magnesium silicate, calcium carbonate, barium sulfate, calcium sulfate, glass fibers, carbon black and silica. The filler, if used, is normally present in an amount by weight ranging from about 5 parts to 100 parts per 100 parts of polyol. A pigment which can be used herein can be any conventional pigment such as titanium dioxide, zinc oxide, iron oxide, antimony oxide, chrome green, chrome yellow, iron blue siennas, molybdate oranges and organic pigments such as para reds, benzidine yellow, toluidine red, toners and phthalocyanines. The polyurethane or polyisocyanurate foams produced can vary in density from about 0.5 pounds per cubic foot to about 60 pounds per cubic foot, preferably from about 1.0 to 20.0 pounds per cubic foot, and most preferably from about 1.5 to 6.0 pounds per cubic foot. The density obtained is a function of how much of the blowing agent or blowing agent mixture disclosed in this invention plus the amount of auxiliary blowing agent, such as water or other co-blowing agents is present in the A and/or B components, or alternatively added at the time the foam is prepared. These foams can be rigid, flexible, or semi-rigid foams, and can have a closed cell structure, an open cell structure or a mixture of open and closed cells. These foams are used in a variety of well known applications, including but not limited to thermal insulation, cushioning, flotation, packaging, adhesives, void filling, crafts and decorative, and shock absorption.

The invention also contemplates forming a thermoplastic form. For example, conventional polystyrene and polyethylene formulations may be combined with the azeotrope-like composition in a conventional manner to produce thermoplastic foams. Examples of thermoplastic foam components include polyolefins, such as for example polystyrene. Other examples of thermoplastic resins include polyethylene, ethylene copolymers, polypropylene, and polyethyleneterephthalate. In certain embodiments, the thermoplastic foamable composition is an extrudable composition. It is also generally recognized that the thermoplastic foamable composition may include adjuvants such as nucleating agents, flame or fire retardant materials, cell modifiers, cell pressure modifiers, and the like.

With respect to thermoplastic foams, the preferred methods generally comprise introducing a blowing agent in accordance with the present invention into a thermoplastic material, and then subjecting the thermoplastic material to conditions effective to cause foaming. For example, the step of introducing the blowing agent into the thermoplastic material may comprise introducing the blowing agent into a screw extruder containing a thermoplastic polymer, and the step of causing foam may comprise lowering the pressure on the thermoplastic material and thereby causing expansion of the blowing agent and contributing to the foaming of the material. Suitable thermoplastic polymers non-exclusively include polystyrene, polyethylene, polypropylene, polyethylene terephthalate, and combinations of these. It will be generally appreciated by those skilled in the art, especially in view of the disclosure herein, that the order and manner in which the blowing agent of the present invention is formed and/or added to the foamable composition does not generally affect the operability of the present invention thermoset or thermoplastic foams. It is contemplated also that in certain embodiments it may be desirable to utilize the present compositions when in the supercritical or near supercritical state as a blowing agent.

The azeotrope-like compositions of this invention may also be used as refrigerant compositions. The refrigerant compositions of the present invention may be used in any of a wide variety of refrigeration systems including air-conditioning, refrigeration, heat-pump systems, and the like. In certain preferred embodiments, the compositions of the present invention are used in refrigeration systems originally designed for use with an HFC-refrigerant, such as, for example, HFC-134a. The preferred compositions of the present invention tend to exhibit many of the desirable characteristics of HFC-134a and other HFC-refrigerants, including non-flammability, and a GWP that is as low, or lower than that of conventional HFC-refrigerants. In addition, the relatively constant boiling nature of the compositions of the present invention makes them even more desirable than certain conventional HFCs for use as refrigerants in many applications.

In certain other preferred embodiments, the present compositions are used in refrigeration systems originally designed for use with a CFC-refrigerant. Preferred refrigeration compositions of the present invention may be used in refrigeration systems containing a lubricant used conventionally with CFC-refrigerants, such as mineral oils, silicone oils, and the like, or may be used with other lubricants traditionally used with HFC refrigerants. In certain embodiments, the compositions of the present invention may be used to retrofit refrigeration systems containing HFC, HCFC, and/or CFC-refrigerants and lubricants used conventionally therewith. Preferably, the present methods involve recharging a refrigerant system that contains a refrigerant to be replaced and a lubricant comprising the steps of (a) removing at least a portion of the refrigerant to be replaced from the refrigeration system while retaining a substantial portion of the lubricant in said system; and (b) introducing to the system a composition of the present invention. As used herein, the term "substantial portion" refers generally to a quantity of lubricant which is at least about 50% by weight of the quantity of lubricant contained in the refrigeration system prior to removal of the chlorine-containing refrigerant. Preferably, the substantial portion of lubricant in the system according to the present invention is a quantity of at least about 60% of the lubricant contained originally in the refrigeration system, and more preferably a quantity of at least about 70%. As used herein the term "refrigeration system" refers generally to any system or apparatus, or any part or portion of such a system or apparatus, which employs a refrigerant to provide cooling. Such refrigeration systems include, for example, air conditioners, electric refrigerators, chillers, transport refrigeration systems, commercial refrigeration systems and the like.

Any of a wide range of known methods can be used to remove refrigerants to be replaced from a refrigeration system while removing less than a major portion of the lubricant contained in the system. For example, because refrigerants are quite volatile relative to traditional hydrocarbon-based lubricants where the boiling points of refrigerants are generally less than 10° C. whereas the boiling points of mineral oils are generally more than 200° C. In embodiments wherein the lubricant is a hydrocarbon-based lubricant, the removal step may readily be performed by pumping chlorine-containing refrigerants in the gaseous state out of a refrigeration system containing liquid state lubricants. Such removal can be achieved in any of a number of ways known in the art, including, the use of a refrigerant recovery system, such as the recovery system manufactured by Robinair of Ohio. Alternatively, a cooled, evacuated refrigerant container can be attached to the low pressure side of a refrigeration system such that the gaseous refrigerant is drawn into the evacuated container and removed. Moreover, a compressor may be attached to a refrigeration system to pump the refrigerant from the system to an evacuated container. In light of the above disclosure, those of ordinary skill in the art will be readily able to remove chlorine-containing lubricants from refrigeration systems and to provide a refrigeration system having therein a hydrocarbon-based lubricant and substantially no chlorine-containing refrigerant according to the present invention.

Any of a wide range of methods for introducing the present refrigerant compositions to a refrigeration system can be used in the present invention. For example, one method comprises attaching a refrigerant container to the low-pressure side of a refrigeration system and turning on the refrigeration system compressor to pull the refrigerant into the system. In such embodiments, the refrigerant container may be placed on a scale such that the amount of refrigerant composition entering the system can be monitored. When a desired amount of refrigerant composition has been introduced into the system, charging is stopped. Alternatively, a wide range of charging tools, known to those of skill in the art, is commercially available. Accordingly, in light of the above disclosure, those of skill in the art will be readily able to introduce the refrigerant compositions of the present invention into refrigeration systems according to the present invention without undue experimentation.

According to certain other embodiments, the present invention provides refrigeration systems comprising a refrigerant of the present invention and methods of producing heating or cooling by condensing and/or evaporating a composition of the present invention. In certain preferred embodiments, the methods for cooling an article according to the present invention comprise condensing a refrigerant composition comprising an azeotrope-like composition of the present invention and thereafter evaporating said refrigerant composition in the vicinity of the article to be cooled. Certain preferred methods for heating an article comprise condensing a refrigerant composition comprising an azeotrope-like composition of the present invention in the vicinity of the article to be heated and thereafter evaporating said refrigerant composition. In light of the disclosure herein, those of skill in the art will be readily able to heat and cool articles according to the present inventions without undue experimentation.

In another embodiment, the azeotrope-like compositions of this invention may be used as propellants in sprayable compositions, either alone or in combination with known propellants. The propellant composition comprises, more preferably consists essentially of, and, even more preferably, consists of the azeotrope-like compositions of the invention. The active ingredient to be sprayed together with inert ingredients, solvents, and other materials may also be present in the sprayable mixture. Preferably, the sprayable composition is an aerosol. Suitable active materials to be sprayed include, without limitation, cosmetic materials such as deodorants, perfumes, hair sprays, cleansers, defluxing agents, and polishing agents as well as medicinal materials such as anti-asthma and anti-halitosis medications. Other uses of the present azeotrope-like compositions include use as solvents, cleaning agents, and the like. Those skilled in the art will be readily able to adapt the present compositions for use in such applications without undue experimentation. It may be desired to separate the azeotrope-like composition of a first component comprising 1,1,1,2,2-pentafluoropropane from a second component which is either the Z-isomer of 1,1,1,2,3-pentafluoropropene or a mixture of the E isomer of 1,1,1,2,3-pentafluoropropene and the Z isomer of 1,1,1,2,3-pentafluoropropene. The complete separation of compounds from an azeotropic mixture cannot be accomplished by a single distillation. It is possible however to take advantage of the pressure dependence of an azeotrope so that the desired product can be purified in a series of distillation columns, this is called a pressure swing distillation. It is known that the composition of an azeotropic mixture varies with pressure variations in that the relative concentrations of the components of the azeotropic mixture will change with pressure. Thus it is possible that two compounds with close boiling points in azeotropic admixture can be separated by distillation, which takes advantage of the pressure variation effect. The first column of a pressure swing distillation of two products (A and B) that form an azeotrope would yield a purified A compound and an azeotrope of A and B. The azeotrope of A and B could then be feed to a second column at a different pressure which sifts the azeotropic composition allowing for the final distillation of compound B. This invention discloses that HFO-1225ye(Z) or a combination of HFO-1225ye(E/Z) and HFC-245cb form an azeotrope. It is possible to separate the HFO-1225ye(Z) or combination of HFO-1225ye(E/Z) from the HFC-245cb by a pressure swing distillation. A pressure swing distillation can be designed from the data given in Tables 1-4 that effectively separated HFO-1225ye(Z) or combination of HFO-1225ye(E/Z) from HFC-245cb.

EXAMPLES

The following non-limiting examples serve to illustrate the invention.

Example 1

An ebulliometer comprising a vacuum jacketed tube with a condenser on top which is further equipped with a Quartz Thermometer is used. About 18.95 g HFO-1225ye(Z) is charged to the ebulliometer and then HFC-245cb is added in small, measured increments. Temperature depression is observed when HFC-245cb is added to HFO-1225ye(Z), indicating a binary minimum boiling azeotrope is formed. From greater than about 0 to about 21 weight percent HFC-245cb, the boiling point of the composition stays below or around the boiling point of HFO-1225ye(Z). The boiling temperature of HFO-1225ye(Z) is about −18.93° C. at 14.4 psia, and the boiling point of HFC-245cb is about −17.6° C. at 14.2 psia. The binary mixtures shown in Table 1 were studied and the boiling point of the compositions did not go above the boiling point of HFO-1225ye(Z). The compositions exhibit azeotrope and/or azeotrope-like properties over this range. Table 2 shows data of the remaining boiling curve of this mixture.

TABLE 1

HFO-1225ye(Z)/HFC-245cb compositions at 14.4 psia

| T (° C.) | Wt. % HFO-1225ye(Z) | Wt. % HFC-245cb |
|---|---|---|
| −18.926 | 100.00 | 0.00 |
| −18.949 | 99.21 | 0.79 |
| −19.015 | 96.00 | 4.00 |
| −19.013 | 93.30 | 6.70 |
| −19.107 | 89.81 | 10.19 |
| −19.128 | 85.28 | 14.72 |
| −19.121 | 81.37 | 18.63 |
| −19.117 | 76.20 | 23.80 |
| −19.117 | 72.25 | 27.75 |
| −19.117 | 68.56 | 31.44 |
| −19.116 | 65.50 | 34.50 |
| −19.117 | 62.13 | 37.87 |

TABLE 2

HFO-1225ye(Z)/HFC-245cb compositions at 14.2 psia

| T (° C.) | Wt. % HFO-1225ye(Z) | Wt. % HFC-245cb |
|---|---|---|
| −17.573 | 0.0 | 100.00 |
| −17.635 | 1.31 | 98.69 |
| −17.783 | 2.99 | 97.01 |
| −17.831 | 7.39 | 92.61 |
| −17.991 | 12.26 | 87.74 |
| −18.154 | 17.60 | 82.40 |
| −18.302 | 23.33 | 76.67 |
| −18.572 | 34.35 | 65.65 |
| −18.750 | 40.24 | 59.76 |
| −18.824 | 44.70 | 55.30 |
| −18.889 | 49.19 | 50.81 |
| −18.986 | 53.96 | 46.04 |
| −19.100 | 58.87 | 41.13 |

Example 2

An ebulliometer comprising a vacuum jacketed tube with a condenser on top which is further equipped with a Quartz Thermometer is used. About 17.15 g HFC-245cb is charged to the ebulliometer and then HFO-E/Z-1225ye is added in small, measured increments. Temperature depression is observed when HFO-E/Z-1225ye is added to HFC-245cb, indicating a binary minimum boiling azeotrope is formed. From greater than about 0 to about 16 weight percent HFO-E/Z-1225ye, the boiling point of the composition stays below or around the boiling point of HFC-245cb. The boiling point of HFC-245cb is about −17.7° C. at 14.4 psia, and the boiling point of HFO-E/Z-1225ye is about −16.5° C. at 14.4 psia. The binary mixtures shown in Table 3 were studied and the boiling point of the compositions did not go above the boiling point of HFC-245cb. The compositions exhibit azeotrope and/or azeotrope-like properties over this range. Table 4 shows data of the remaining boiling curve of this mixture. For Examples 1-2 an ebulliometer as described by Swietolslowski in "Ebulliometric Measurements" (Reinhold, 1945) was used.

TABLE 3

HFO-E/Z-1225ye/HFC-245cb compositions at 14.4 psia

| T (° C.) | Wt. % HFC-245cb | Wt. % HFO-E/Z-1225ye |
|---|---|---|
| −17.749 | 100.00 | 0.0 |
| −17.810 | 97.72 | 2.28 |
| −17.871 | 95.33 | 4.67 |
| −17.876 | 90.07 | 9.93 |
| −17.994 | 87.10 | 12.90 |
| −17.954 | 83.86 | 16.14 |
| −17.903 | 80.40 | 19.60 |
| −17.866 | 75.09 | 24.91 |
| −17.738 | 69.57 | 30.43 |
| −17.710 | 65.78 | 34.22 |
| −17.671 | 61.94 | 38.06 |
| −17.627 | 58.35 | 41.65 |
| −17.549 | 54.48 | 45.52 |
| −17.535 | 51.83 | 48.17 |

TABLE 4

HFO-E/Z-1225ye/HFC-245cb compositions at 14.4 psia

| T (C.) | Wt. % HFO-E/Z-125ye | Wt. % HFC-245cb |
|---|---|---|
| −16.500 | 100.00 | 0.00 |
| −16.517 | 99.42 | 0.58 |
| −16.650 | 91.99 | 8.01 |
| −16.872 | 84.67 | 15.33 |
| −16.957 | 80.95 | 19.05 |
| −17.010 | 76.72 | 23.28 |
| −17.050 | 68.83 | 31.17 |
| −17.107 | 62.73 | 37.27 |
| −17.157 | 56.84 | 43.16 |
| −17.207 | 52.98 | 47.02 |
| −17.272 | 49.26 | 50.74 |

Example 3

Distillation Example

A sample of HFO-1225ye(Z) that contained HFO-1234yf and HFC-245cb impurities was distilled in a stainless steel column. The column was 1 in. diameter and 42 in. tall and packed with Monel heli-pak which contained ~80 theoretical stages. The column overhead was maintained at 9.6° C. by means of a jacketed condenser. The column reboiler was maintained at 10° C. using an electric heater. The initial overhead product was analyzed by GC for purity and GC/MS to identify the impurities. The following chromatogram shows the HFO-1234yf and HFC-245cb peaks that were analyzed by GC during the distillation. Sample #1 to sample #6 follow a chronological order at the beginning of the distillation which shows the removal of HFO-1234yf. As seen the HFO-1234yf is being removed from the product as the distillation proceeds while the HFC-245cb concentration remains nearly constant throughout the distillation. The distillation result demonstrates that it is very difficult to remove the impurities HFC-245cb from mixtures containing HFO-1225yeZ. This example also confirms the azeotropic behavior of HFO-1225yeZ and HFC-245cb.

Example 4

Process Distillation

The data reported in Tables 1 and 2 were used to design a process in which HFO-1225ye(Z) could be effectively separated from HFC-245cb and HFO-1234yf. The approach taken here is to use a pressure swing distillation. Pressure swing distillations are known to one skilled in the art. The distillation train consists of 3 columns in series. As a specific example a feed to the first column of 25:25:50 wt % 245cb: 1234yf: 1225ye(Z) is used. The first column is used to separate the HFO-1234yf in the overhead. The second feed comes from the first columns reboiler and is run at high pressure (2000 kPa). The HFC-245cb is removed in the reboiler of the second column and the near azeotropic concentration from the condenser of the second column is passed to the third column. The third column is run a lower pressure (500 kPa) which shifts the azeotrope allowing for the final distillation of the HFO-1225ye(Z) which is collected in the reboiler of the third column. This distillation was modeled using the process simulator UNISIM. The material stream information calculated using UNISIM is given in Table 5.

TABLE 5

UNISIM process distillation results

| Stream | Feed | Col#1 Cond. HFO-1234yf product | Col#1 Reboil. | Col#2 Feed | Col#2 Top | Col#2 Reboil. HFC-245cb Product | Col#3 Top | Col#3 Reboil. HFO-1225ye (Z) product |
|---|---|---|---|---|---|---|---|---|
| Vapor Fraction | 0 | 1 | 0 | 0 | 1 | 0 | 1 | 0 |
| Temp, ° C. | 80.0 | 7.8 | 17.7 | 100.0 | 80.3 | 84.3 | 24.6 | 25.5 |
| Press, kPa | 2086.6 | 400.0 | 400.0 | 2944.5 | 2000.0 | 2000.0 | 500.0 | 500.0 |
| Molar Flow, kmol/hr | 100.0 | 23.8 | 76.2 | 76.2 | 58.1 | 18.1 | 38.1 | 20.0 |
| Mass Frac 245cb | 0.2500 | 0.0001 | 0.3176 | 0.3176 | 0.1075 | 0.9757 | 0.1131 | 0.0971 |
| Mass Frac 1234yf | 0.2500 | 0.9995 | 0.0473 | 0.0473 | 0.0625 | 0.0000 | 0.0957 | 0.0000 |
| Mass Frac 1225ye(Z) | 0.5000 | 0.0004 | 0.6351 | 0.6351 | 0.8300 | 0.0243 | 0.7912 | 0.9029 |

This type of distillation can be used for other starting materials this particular starting concentration is used as a representative example to all other starting concentrations.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. An azeotrope-like composition comprising a first component comprising 1,1,1,2,2-pentafluoropropane and a second component which comprises either the Z isomer of 1,1,1,2,3-pentafluoropropene or a mixture of the E isomer of 1,1,1,2,3-pentafluoropropene and the Z isomer of 1,1,1,2,3-pentafluoropropene.

2. The azeotrope-like composition of claim 1 wherein the second component comprises the Z isomer of 1,1,1,2,3-pentafluoropropene.

3. The azeotrope-like composition of claim 2 comprising from about 1 wt. % to about 50 wt. % of 1,1,1,2,2-pentafluoropropane and from about 50 to about 99 weight percent of the Z isomer of 1,1,1,2,3-pentafluoropropene.

4. The azeotrope-like composition of claim 2 comprising from about 4 wt. % to about 46 wt. % of 1,1,1,2,2-pentafluoropropane and from about 54 to about 96 weight percent of the Z isomer of 1,1,1,2,3-pentafluoropropene.

5. The azeotrope-like composition of claim 2 comprising from about 11 wt. % to about 41 wt. % of 1,1,1,2,2-pentafluoropropane and from about 59 to about 89 weight percent of the Z isomer of 1,1,1,2,3-pentafluoropropene.

6. The azeotrope-like composition of claim 2 which has a boiling point of from about 18.9° C. to about −19.3° C. at a pressure of about 14.4 psia.

7. The azeotrope-like composition of claim 1 wherein the second component comprises a mixture of the E isomer of 1,1,1,2,3-pentafluoropropene and the Z isomer of 1,1,1,2,3-pentafluoropropene.

8. The azeotrope-like composition of claim 7 wherein the Z isomer is present in the second component at a weight ratio of from about 5 wt. % to about 95 wt. %, and the E isomer is present in the second component at a weight ratio of from about 95 wt. % to about 5 wt. % based on the total weight of the second component.

9. The azeotrope-like composition of claim 7 wherein the Z isomer is present in the second component at a weight ratio of from about 15 wt. % to about 90 wt. %, and the E isomer is present in the second component at a weight ratio of from about 85 wt. % to about 10 wt. % based on the total weight of the second component.

10. The azeotrope-like composition of claim 7 wherein the Z isomer is present in the second component at a weight ratio of from about 45 wt. % to about 85 wt. %, and the E isomer is present in the second component at a weight ratio of from about 55 wt. % to about 15 wt. % based on the total weight of the second component.

11. The azeotrope-like composition of claim 7 wherein the azeotrope-like composition comprises from about 70 wt. % to less than 100 wt. % of 1,1,1,2,2-pentafluoropropane and from greater than zero to about 30 wt. % of the second component.

12. The azeotrope-like composition of claim 7 wherein the azeotrope-like composition comprises from about 75 wt. % to about 95 wt. % of 1,1,1,2,2-pentafluoropropane and from about 5 wt. % to about 25 wt. % of the second component.

13. The azeotrope-like composition of claim 7 wherein the azeotrope-like composition comprises from about 80 wt. % to about 90 wt. % of 1,1,1,2,2-pentafluoropropane and from about 10 wt. % to about 20 wt. % of the second component.

14. The azeotrope-like composition of claim 7 which has a boiling point of from about −17.7° C. to about −18° C. at a pressure of about 14.4 psia.

15. A sprayable composition comprising a material to be sprayed and a propellant comprising the azeotrope-like composition of claim 1.

16. A refrigerant composition comprising the azeotrope-like composition of claim 1.

17. A refrigeration system comprising the refrigerant composition of claim 16.

18. A method for changing the temperature of an article which comprises condensing the refrigerant composition of claim 16 and thereafter evaporating said refrigerant composition in the vicinity of the article which is to be cooled, or heating an article which comprises condensing the refrigerant composition in the vicinity of the article to be heated and thereafter evaporating said refrigerant composition.

19. A method of recharging a refrigerant system that contains a refrigerant to be replaced and a lubricant comprising the steps of: (a) removing at least a portion of the refrigerant to be replaced from the refrigeration system while retaining a substantial portion of the lubricant in said system; and (b) introducing to the system a refrigerant composition of claim 16.

20. The foamable composition of claim 16 wherein said at least one thermoset component comprises a composition capable of forming a polyurethane foam, a polyisocyanurate foam, or a phenolic foam.

21. A blowing agent comprising the azeotrope-like composition of claim 1.

22. A foamable composition comprising the azeotrope-like composition of claim 1 and a composition capable of forming a thermoset foam.

23. The foamable composition of claim 22 wherein composition capable of forming a thermoplastic foam comprises a polystyrene, polyethylene, polypropylene, polyethyleneterephthalate, and combinations thereof.

24. A polyol premix composition which comprises a combination of a blowing agent, a polyol, a surfactant, and an amine catalyst, wherein the blowing agent comprises the azeotrope-like composition of claim 1.

25. The polyol premix composition of claim 24 wherein the blowing agent further comprises a hydrocarbon, halogenated hydrocarbon, $CO_2$ generating material, or combinations thereof.

26. The polyol premix composition of claim 25 wherein the halogenated hydrocarbon comprises a chlorofluorocarbon, hydrochlorofluorocarbon, hydrofluorocarbon, or combinations thereof.

27. A method for modifying a refrigeration apparatus which refrigeration apparatus comprises a refrigerant, which refrigerant comprises a combination of a chlorofluorocarbon or a hydrochlorofluorocarbon and a mineral oil, comprising removing at least a portion of the chlorofluorocarbon or hydrochlorofluorocarbon from the refrigerant and leaving a residue comprising the mineral oil, and adding to said residue an azeotrope-like composition comprising a first component comprising 1,1,1,2,2-pentafluoropropane and a second component which comprises either the Z isomer of 1,1,1,2,3-pentafluoropropene or a mixture of the E isomer of 1,1,1,2,3-pentafluoropropene and the Z isomer of 1,1,1,2,3-pentafluoropropene.

28. A foamable composition comprising the azeotrope-like composition of claim 1 and a composition capable of forming a thermoplastic foam.

29. A process for separating a first component comprising 1,1,1,2,2-pentafluoropropane from an azeotrope-like composition of 1,1,1,2,2-pentafluoropropane and a second component which comprises either the Z-isomer of 1,1,1,2,3-pentafluoropropene or a mixture of the E isomer of 1,1,1,2,3-pentafluoropropene and the Z isomer of 1,1,1,2,3-pentafluoropropene comprising the steps of (A) distilling a composition comprising an azeotrope-like composition of a first component comprising 1,1,1,2,2-pentafluoropropane and a second component which comprises either the Z-isomer of 1,1,1,2,3-pentafluoropropene or a mixture of the E isomer of 1,1,1,2,3-pentafluoropropene and the Z isomer of 1,1,1,2,3-pentafluoropropene at a first pressure to produce a first overhead stream enriched in either the first component comprising 1,1,1,2,2-pentafluoropropane or the second component which comprises Z-isomer of 1,1,1,2,3-pentafluoropropene or a mixture of the E isomer of 1,1,1,2,3-pentafluoropropene and the Z isomer of 1,1,1,2,3-pentafluoropropene and a first bottoms stream enriched in the other component; and (B) redistilling the first overhead stream at a second pressure to produce a second overhead stream enriched in the component enriched in the first bottoms stream and a second bottoms stream enriched in the component enriched in the first overhead stream.

30. A process for separating a first component comprising 1,1,1,2,2-pentafluoropropane from an azeotrope-like composition of 1,1,1,2,2-pentafluoropropane and a second component which comprises either the Z-isomer of 1,1,1,2,3-pentafluoropropene or a mixture of the E isomer of 1,1,1,2,3-pentafluoropropene and the Z isomer of 1,1,1,2,3-pentafluoropropene comprising subjecting the azeotrope-like composition to pressure swing distillation.

* * * * *